United States Patent
Gautier

(10) Patent No.: US 7,234,889 B2
(45) Date of Patent: Jun. 26, 2007

(54) AUTOMATICALLY LOCKING ACCESSORY FOR CONDUITS

(75) Inventor: Bruno Gautier, Sille le Guillaume (FR)

(73) Assignees: Legrand France, Limoges (FR); Legrand SNC, Limoges (FR)

( * ) Notice: Subject to any disclaimer, the term of this patent is extended or adjusted under 35 U.S.C. 154(b) by 208 days.

(21) Appl. No.: 10/875,947

(22) Filed: Jun. 25, 2004

(65) Prior Publication Data

US 2005/0012335 A1 Jan. 20, 2005

(30) Foreign Application Priority Data

Jul. 15, 2003 (FR) .................................. 03 08594

(51) Int. Cl.
*H02G 3/00* (2006.01)
(52) U.S. Cl. .................... 403/403; 403/92; 403/382; 174/481; 385/135; 52/220.7
(58) Field of Classification Search .................. 403/84, 403/92, 382, 403; 174/48; 385/135; 52/220.7; 285/181, 182, 184
See application file for complete search history.

(56) References Cited

U.S. PATENT DOCUMENTS

| 1,804,954 | A | * | 5/1931 | Rutherford | 285/181 |
| 4,589,449 | A | * | 5/1986 | Bramwell | 138/162 |
| 4,635,413 | A | * | 1/1987 | Hansen et al. | 52/92.2 |
| 5,161,580 | A | * | 11/1992 | Klug | 138/92 |
| 5,917,982 | A | * | 6/1999 | Vargas et al. | 385/134 |
| 6,156,977 | A | * | 12/2000 | Benito-Navazo | 174/97 |
| 6,188,024 | B1 | * | 2/2001 | Benito-Navazo | 174/97 |
| 6,344,611 | B2 | * | 2/2002 | Ewer et al. | 174/48 |
| 6,478,499 | B1 | * | 11/2002 | Fugman et al. | 403/82 |
| 6,524,180 | B1 | * | 2/2003 | Simms et al. | 454/65 |
| 6,599,056 | B1 | * | 7/2003 | Piole et al. | 403/382 |
| 6,806,419 | B2 | * | 10/2004 | Destruel et al. | 174/48 |
| 6,874,969 | B2 | * | 4/2005 | Jadaud et al. | 403/92 |
| 6,916,986 | B1 | * | 7/2005 | Herzog et al. | 174/48 |
| 6,972,368 | B2 | * | 12/2005 | VanderVelde | 174/48 |
| 2002/0006312 | A1 | * | 1/2002 | Buard | 403/403 |
| 2002/0125028 | A1 | * | 9/2002 | Jadaud et al. | 174/48 |

FOREIGN PATENT DOCUMENTS

EP 0 734 107 A1 * 9/1996
FR 2 285 527 12/2002

* cited by examiner

*Primary Examiner*—James M. Hewitt
(74) *Attorney, Agent, or Firm*—Young & Thompson

(57) ABSTRACT

An accessory for connecting a portion of a first conduit to a portion of at least one second conduit or to another accessory, which accessory includes a base element and an end element including complementary engagement elements co-operating with one another to allow relative displacement between the end element and the base element between a position in which the end element is deployed relative to the base element, and a position in which the end element is retracted onto the base element. The accessory includes resilient return elements distinct from the complementary engagement elements and suitable for acting between the base element and the end element in order to return the end element into the deployed position.

17 Claims, 5 Drawing Sheets

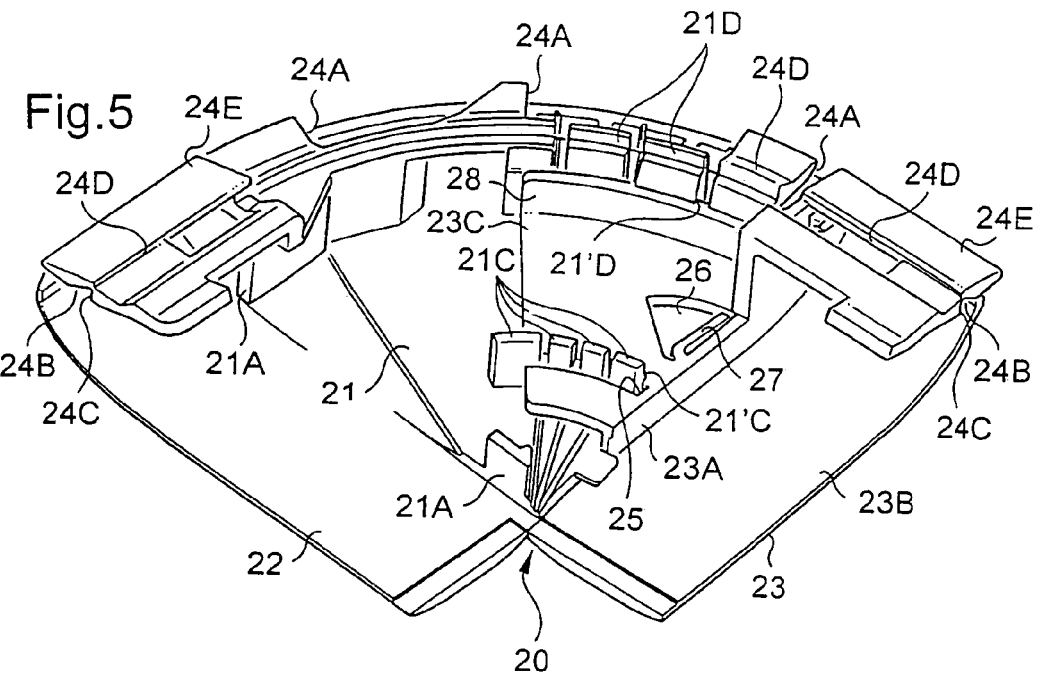
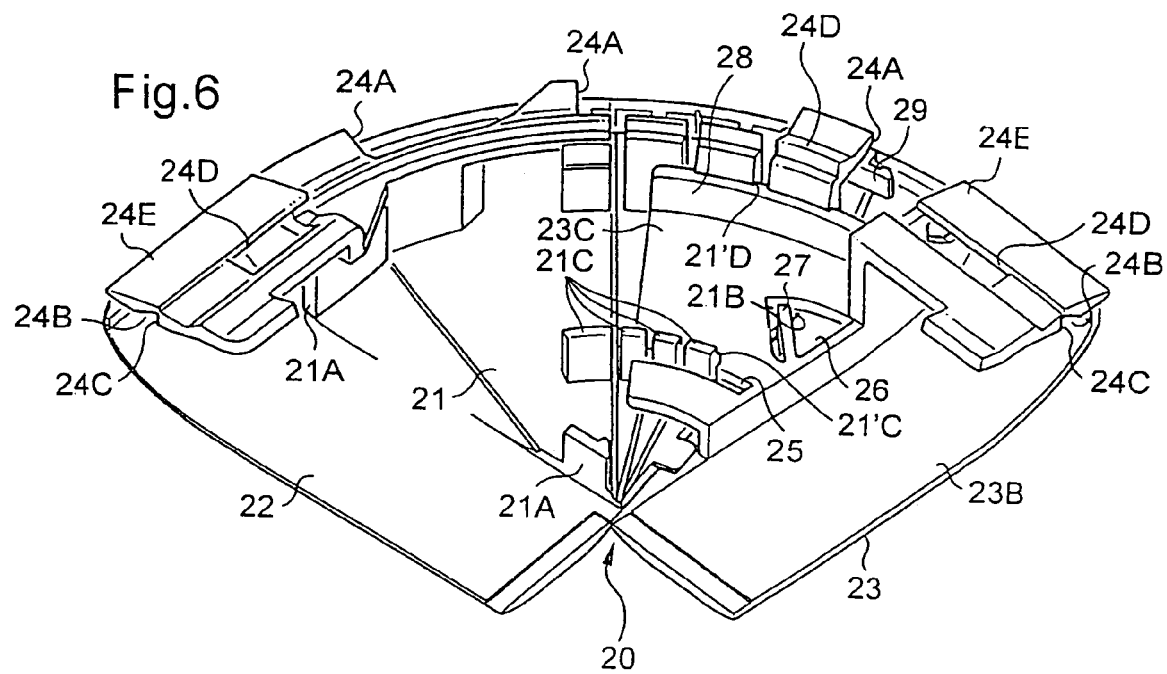

AUTOMATICALLY LOCKING ACCESSORY FOR CONDUITS

FIELD OF THE INVENTION

In general terms, the invention relates to an accessory for connecting a portion of a first conduit to a portion of at least one second conduit or to another accessory, which accessory comprises at least two elements, namely a base element for engaging on said portion of the first conduit so as to cover an edge of said portion, and an end element fitted on the base element for engaging on said portion of at least the second conduit or on the other accessory to cover an edge thereof, said base element and said end element including complementary engagement means co-operating with one another to allow said end element and said base element to move relative to each other between a position in which the end element is deployed relative to the base element and a position in which the end element is retracted onto the base element.

The invention finds a particularly advantageous application in making a conduit corner accessory to establish continuity between the flanges of two conduit channels extending in different directions.

Nevertheless, the invention can also be applied to any type of conduit accessory such as a junction, a branch connection, and endpiece, or indeed a support for electrical equipment.

BACKGROUND OF THE INVENTION

Corner accessories of the above-mentioned type are disclosed in particular in documents FR 2 727 578, US 1,804, 954, US 1,727,772, EP 0 823 762, EP 1 006 634, IT 1 281 832, IT 1 281 834, EP 0 283 575, and FR 2 825 527, in which the end element and the base element are mounted to pivot one on the other so that they are suitable for being positioned in different relative angular positions.

Furthermore, in the corner accessory described in document FR 2 825 527 in the name of the Applicants, releasable locking means are provided constituted by a series of notches and a pivoting tooth that co-operate with one another to lock the angular position of the end element and the base element relative to each other.

The major drawback of the above-mentioned corner accessory is that it does not suffice for the installer merely to put the accessory into place on the conduit channels in order to lock the accessory onto the channels.

After the accessory has been put into place on the conduit channels, the installer needs to lock the base element and the end element of said accessory in position by means of the releasable locking means so that the accessory mounted on said channels is mechanically retained thereon and the installation complies with standards, in particular in terms of leaktightness.

During the locking operation, the corner accessory can appear to be properly mounted on the conduit channels while not, in fact, presenting any mechanical strength and not performing its sealing function or its leaktight continuity function.

On worksites, such a locking operation is inconvenient to perform and can easily be forgotten by the installer.

OBJECTS AND SUMMARY OF THE INVENTION

In order to remedy that drawback in the state of the art, the invention proposes an accessory as defined in the introduction which, while it is being put into place, locks automatically onto the corresponding channel or other accessory.

Such an accessory is advantageously suitable for being mounted by an installer using one hand only.

More particularly, the accessory of the invention includes resilient return means distinct from said complementary engagement means and suitable for acting between the base element and the end element in order to return the end element into said deployed position.

Other non-limiting and advantageous characteristics of the accessory of the invention are as follows:

said engagement means enable the end element to pivot relative to the base element;

said engagement means allow the end element to move in translation relative to the base element;

said engagement means comprise a strip having a slot engaged thereon;

the strip belongs to the base element and the slot belongs to the end element;

the strip and the slot extend over a circular arc or along a straight line;

said engagement means comprise a groove in which a rib slides;

the groove belongs to the base element and the rib belongs to the end element;

the resilient return means comprise a flexible tongue interposed between the base element and the end element;

the said tongue is made integrally with one of the elements and bears via its free end against an end edge of the other one of said elements;

the tongue is attached to the end element and extends freely in a window provided in said end element;

the end element comprises two plates, an outer plate for covering the edge of the portion of the second conduit or accessory, and an inner plate, with a portion of the base element being sandwiched between the plates;

the inner plate of the end element includes firstly a slot co-operating with a strip projecting from said portion of said base element, and secondly a window into which there extends freely a flexible tongue attached to an edge of said window, said tongue bearing against an end edge of said base element;

the inner plate of the end element includes a rim forming a rib and said portion of the base element includes a projecting strip in which there is formed a groove in which said rib slides;

the base element includes at least one break-off portion, which may constitute an angular sector;

the base element comprises a central portion on which the end element is fitted, and an end portion situated remote from the end element, the outer plate of the end element presenting outside appearance that is identical to the outside appearance of the end portion of the base element; and the accessory constitutes a cheek for establishing wall continuity between two flanges of two conduit channels extending in the same direction or in two different directions. In which case, said cheek may carry a band providing wall continuity between the bracket-forming rims of the flanges of said channels, said band including mounting means for mounting a cover segment adapted to close said channels.

BRIEF DESCRIPTION OF THE DRAWINGS

The following description with reference to the accompanying drawings, given as non-limiting examples, makes it clearly understood what the invention consists and how it can be implemented.

In the accompanying drawings:

FIG. 5 is a rear view of the FIG. 1 accessory with the end element in the retracted position;

FIG. 6 is a rear view of the FIG. 1 accessory with the end element in the deployed position;

MORE DETAILED DESCRIPTION

Figure 1:
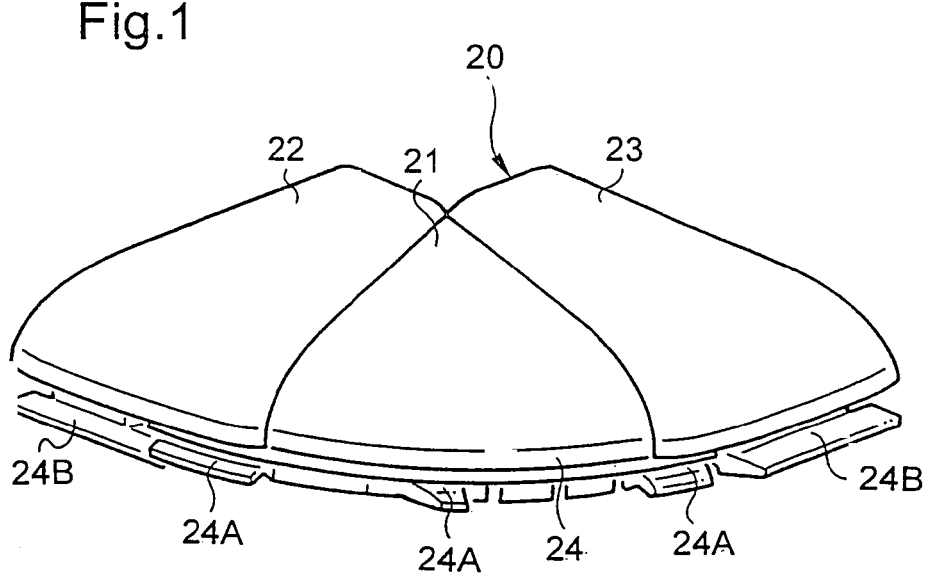
FIG. 1 is a diagrammatic perspective view of a preferred embodiment of an accessory of the invention.

FIG. 1 shows an accessory used to establish a connection between two cut segments of conduit placed end to end, in this case to form an outside corner.

Figure 2:
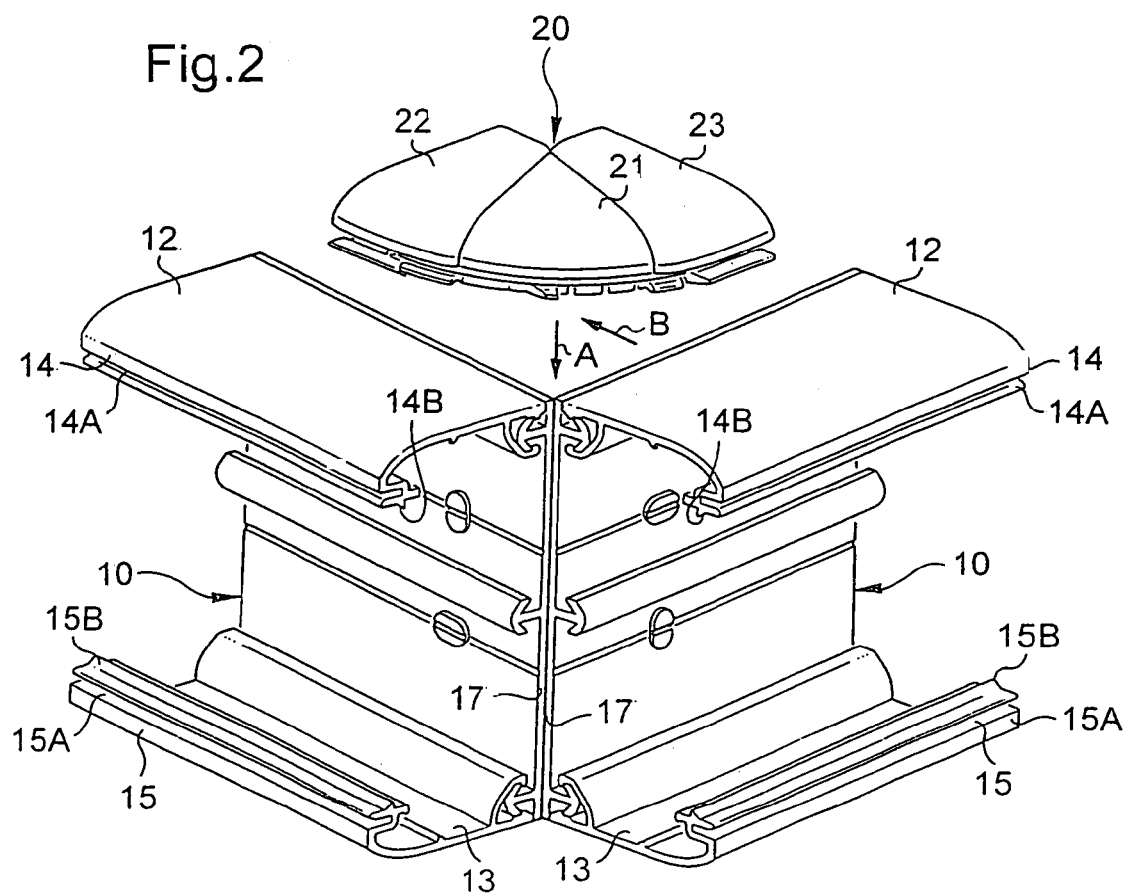
FIG. 2 is a diagrammatic perspective view of the FIG. 1 accessory ready for fitting to two conduit channel segments.
Figure 3:
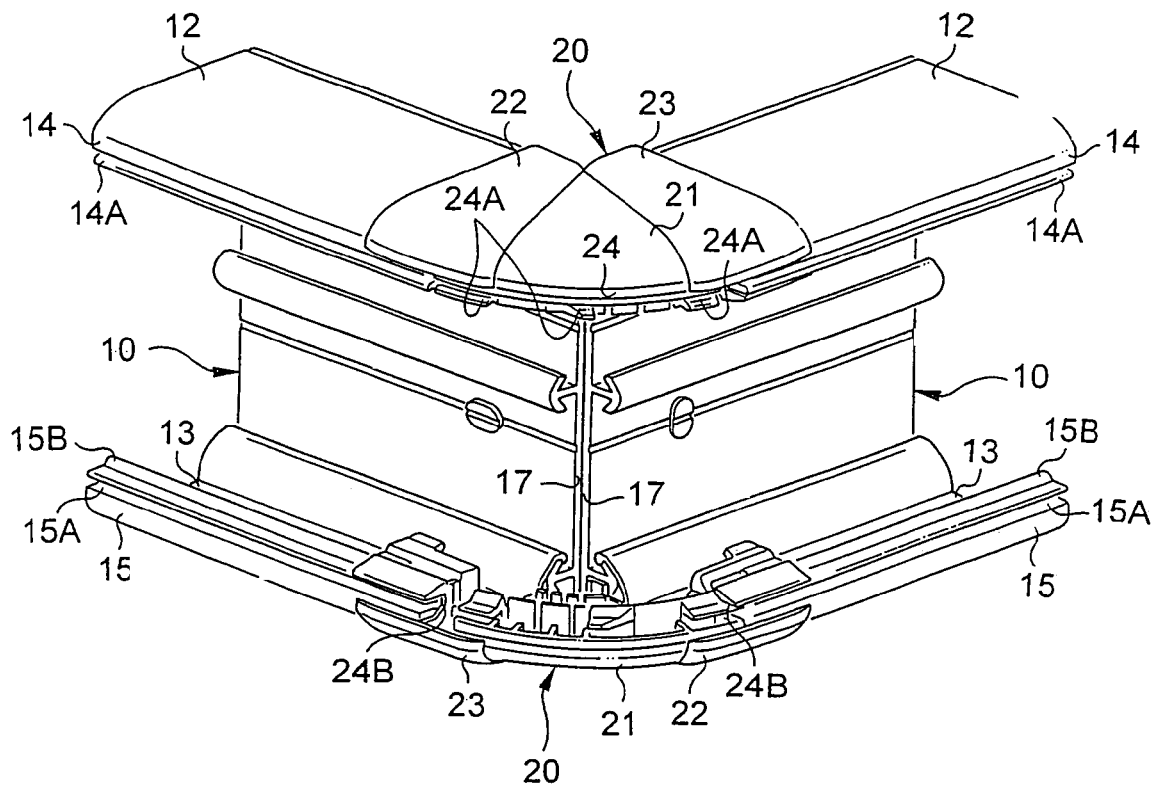
FIG. 3 is a diagrammatic perspective view of two accessories of the FIG. 1 type fitted to two conduit channel segments.
Figure 4:
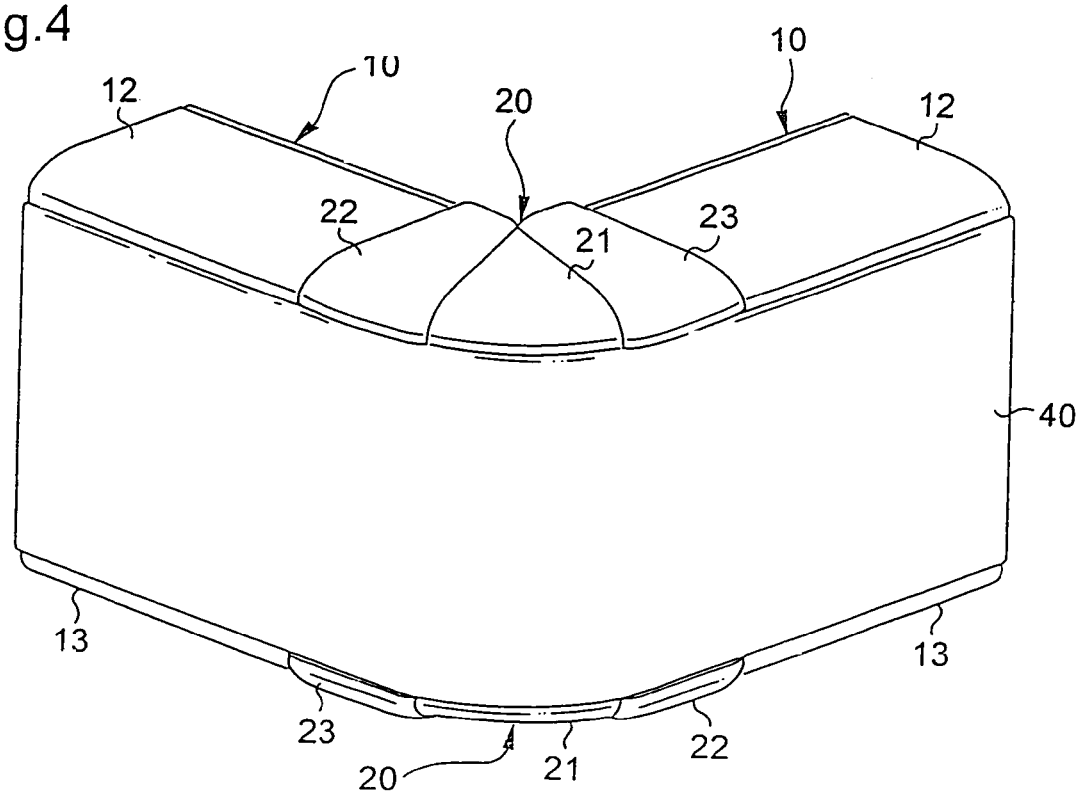
FIG. 4 is a diagrammatic perspective view of the FIG. 3 channels closed by a cover segment.

As shown in FIGS. 2 to 4, the two conduit segments are identical, each essentially comprising a channel 10 provided with two flanges 12, 13 having bracket-forming rims 14, 15 facing each other and including means for mounting a cover segment 40 (see FIG. 4) for closing said channel 10.

The channels 10 are preferably made by extruding a plastics material.

In this case, for each of the bracket-forming ribs 14, 15, the cover segment mounting means comprise engagement means constituted by respective grooves 14A, 15A, and outside each groove 14A, 15A, close to its bottom, a respective snap-fastening bead 14B, 15B (see FIGS. 2 and 3), each snap-fastening bead 14B, 15B running along each groove 14A, 15A.

In corresponding manner, the cover segment 40 has complementary mounting means which are suitable for co-operating firstly with each groove 14A, 15A, and secondly with each snap-fastening bead 14B, 15B.

Since the cover segment 40 does not, strictly speaking, form part of the invention, its means for mounting on the channels 10 are not described in greater detail herein.

It is of interest to observe at this point that the cover segment 40, advantageously made of plastics material, is arranged to present a certain amount of flexibility so as to be adapted to a groove and snap-fastening bead in a configuration that presents a curved path of determined radius of curvature, as explained below.

The accessory 20 shown in FIG. 1 serves in this case as a cheek for establishing wall continuity between two flanges 12 or 13 of said conduit channels 10 extending in two different directions, forming a miter joint via the cut end edges 17 of their webs.

Naturally, in other variants (not shown), provision can be made for the accessory to be a cheek which provides wall continuity between two subdividing partitions fitted to the webs of the touching channels 10 or a "junction" cheek providing wall continuity between the flanges of the conduit channels touching in a single direction. Such an accessory may also be a branch connection, an endpiece, or an inside corner accessory, or indeed a support for equipment.

The accessory 20 carries a band 24 providing wall continuity between the bracket-forming rims on the flanges 14, 15 on the flanges 12, 13 of said channel 10 (see FIG. 3).

The band 24 includes means for mounting a cover segment, which means extend, in this case discontinuously, around an arc of a circle of given radius of curvature, such that said corner accessory advantageously enables the cover segment 40 for closing said channels 10 to be mounted in such a manner as to enable the angle formed between said channels 10 to be closed together with portions of said channels by a single cover segment 40 without any interruption or edge or fold in said angle (see FIG. 4).

In this case, the mounting means comprise groove portions 24A providing groove continuity between the grooves 14A, 15A provided on the bracket-forming rims 14, 15 of the flanges 12, 13 of said channels 10.

In addition, they comprise snap-fastening bead portions 24D (see FIGS. 5 and 6) that provide snap-fastening bead continuity between the snap-fastening beads 14B, 15B provided on the bracket-forming rims 14, 15 of the flanges 12, 13 of the touching channels 10. As shown more particularly in FIGS. 5 and 6, two of said snap-fastening bead portions 24D are provided on the back of tongues 24E provided on the rear face of the accessory 20, co-operating with the band 24 to define a groove 24B for engaging the accessory 20 on the bracket-forming rims 14, 15 of said channels 10 (see FIG. 3), for connecting the accessory 20 to said channels 10. These tongues 24E include respective front fastening teeth 24C for snapping against said snap-fastening beads 14B, 15B provided on the bracket-forming rims 14, 15 of the flanges 12, 13 of the touching channels 10.

As shown in FIGS. 5 to 10, the accessory 20 shown in FIG. 1 comprises at least two elements, i.e. a base element 21, 22 (see FIGS. 7 and 8) for engaging on a flange 12, 13 of one of said touching conduit channels 10 so as to cover the edge of said flange 12, 13, and an end element 23 (see FIGS. 9 and 10) fitted to the base element 21, 22 for the purpose of engaging on a flange 12, 13 of the other one of said touching conduit channels 10 in order to cover an edge thereof.

Preferably, the base element 21, 22 and the end element 23 of the accessory 20 are one-piece moldings of plastics material.

More particularly, the base element 21, 22 of the accessory 20 comprises firstly an end portion 22 which carries on its rear face the tongue 24E that co-operates with the band 24 to define said groove 24B for engaging on the bracket-forming rim 14, 15 of a flange 12, 13 of a channel 10 so that said end portion 22 covers the cut edge thereof, and secondly a central portion 21 providing wall continuity between the two flanges 12, 13 of the channels 10.

The end element 23 of the accessory 20 is fitted on the central portion 21 of the base element 21, 22.

To this end, the end element 23 comprises two plates, an outer plate 23B for covering the cut edge of the flange 12, 13 of the corresponding channel 10, and an inner plate 23C, with a fraction of the central portion 21 of the base element 21, 22 (see FIGS. 9 and 10) being sandwiched between the plates.

The outer plate 23B of the end element 23 carries said tongue 24E on its rear face, the tongue co-operating with the band 24 to define said groove 24B for engagement on the bracket-forming rim 14, 15 of a flange 12, 13 of the corresponding channel 10 so that the outer plate 23B of the end element covers the cut edge of said flange 12, 13.

The outer plate 23B of the end element 23 presents outside appearance that is identical to the outside appearance of the end portion 22 of the base element 21, 22.

In this case, the central portion 21 of the base element 21, 22 forms an angular sector, the end portion 22 of the base element 21, 22 forms another angular sector, and the end element 23 also forms an angular sector, identical to the sector formed by the end portion 22 of the base element 21, 22.

On its rear face facing towards the inside of the channels 10, the outer plate 23B of the end element 23 carries a low wall 23A extending along a radius. The inner plate 23C is cantilevered out from the low wall 23A facing the rear face of said outer plate 23B. The low wall 23A also carries said tongue 24E which co-operates with the band 24 to define the engagement groove 24B. While the accessory 20 is being put into place on the conduit segments, the low wall 23A forms a bearing rim of the end element 23 of the accessory 20 for bearing against the cut edge of the flange 12, 13 of the corresponding channel 10, as explained below.

On its rear face facing towards the insides of the channels 10, and at the junction between its central portion 21 and its end portion 22, the base element 21, 22 of the accessory 20 carries two low wall fractions 21A extending along a radius. One of the two low wall fractions 21A carries said tongue 24E that co-operates with the band 24 to define the engagement groove 24B. While the accessory 20 is being put into place on the conduit segments, these low wall fractions 21A form a bearing rim whereby the base element 21, 22 of the accessory 20 bears against the cut edge of the flange 12, 13 of the corresponding channel 10, as explained below.

Furthermore, the base element 21, 22 and the end element 23 of the accessory 20 include complementary engagement means co-operating with each other to allow relative displacement of said end element 23 and said base element 21, 22 between a position in which the end element 23 is deployed relative to the base element 21, 22 (see FIG. 6) and a retracted position where the end element 23 overlaps the base element 21, 22 to some extent (see FIG. 5).

In this case, the engagement means enable the end element 23 to pivot relative to the base element 21, 22 in the plane of said touching flanges 12, 13 of said channels 10 so that said elements are suitable for being positioned in different relative angular positions so that the accessory 20 can adapt to the angle formed between the channels 20 of the conduit segments.

Naturally, for an accessory that forms a junction, an endpiece, or an equipment support, provision could be made for the complementary engagement means of the base element and of the end element to accommodate movement in translation of the two elements relative to each other.

In the embodiment of the accessory 20 shown in FIGS. 5 and 6, these complementary engagement means comprise firstly a strip 21C on which a slot 25 is engaged, and secondly a groove 21'D in which a rib 28 slides.

In this case, the strip 21C, the slot 25, the groove 21'D, and the rib 28 extend around two concentric circular arcs so as to enable relative pivoting movement between the two elements of the accessory 20. However, in a variant of the accessory that is not shown, provision could be made for the strip, the slot, the groove, and the rib to extend along two parallel straight lines so as to allow the two elements of the accessory to move in relative translation.

As shown in FIGS. 5 to 10, in the embodiment of the accessory as shown, the strip 21C and the groove 21'D belong to the base element 21, 22 while the slot 25 and the rib 28 belong to the end element 23.

More particularly, the inner plate 23C of the end element 23 includes the slot 25 which opens out into its free edge and which engages on the strip 23C which projects from the rear face of the central portion 21 of the base element 21, 22 sandwiched between the inner and outer plates 23C and 23B of the end element 23.

On one face, the strip 21C includes a tooth 21'C which bears against the edge of the slot 25 in the inner plate 23C of the end element 23 so as to press said element against the base element 21, 22.

The inner plate 23C in the form of an angular sector has a rim forming the rib 28 and, close to its band 24, said central portion 21 of the base element 21, 22 includes a strip 21D which projects from its rear face, which extends in a circular arc, and in which there is formed the groove 21'D in which said rib 28 slides.

The band 24 of the accessory 20, the strip 21C on which the slot 25 engages, and the groove 21'D in which the rib 28 slides all extend on circular arcs that are concentric.

Figure 7:
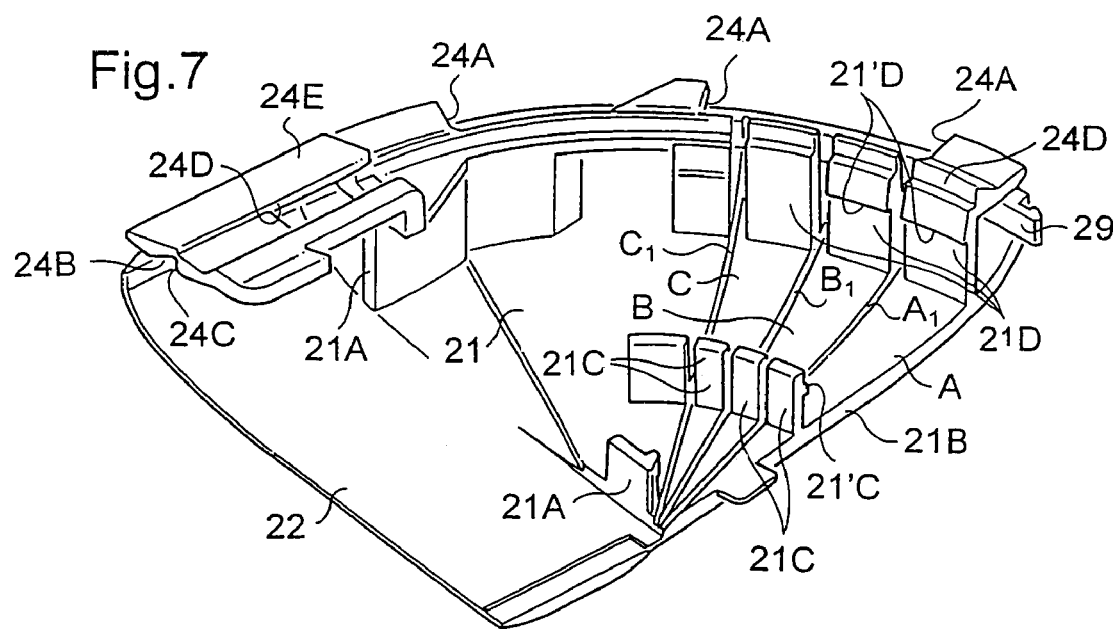
FIG. 7 is a rear view of the base element of the FIG. 1 accessory.

As shown more particularly in FIG. 7, the central portion of the base element 21, 22 of the accessory 20 includes, remote from the end portion 22, at least one break-off portion. In this case, it has a plurality of break-off portions A, B, and C defined by lines of weakness A1, B1, C1 subdividing the strips 21C and 21D carried by said central portion 21 into tongues.

Each break-off portion A, B, C occupies an angular sector.

The end element 23 and in particular its outer plate 23B serve to cover any cut that might be formed in the central portion 21 of the base element 21, 22, along a line of weaknesses A1, B1, or C1 in order to improve the appearance of the assembly.

By detaching one or more break-off portions A, B, C from the central portion 21 of the base element 21, 22, the user can adapt the accessory 20 shown to various different outside angles lying in the range 90° to 120° formed between the conduit segment channels 10.

When the user detaches one of the break-off portions A, B, C, the strips 21C and 21D are shortened correspondingly since they are made up of tongues, each belonging to different ones of the break-off portions of the base element 21, 22.

In the example shown, by breaking off the portion A from the base element 21, 22, the accessory 20 can be adapted, by pivoting the base element and the end element relative to each other, to an outside angle of about 100°.

By breaking off the portions A and B from the base element 21, 22, the accessory 20 can be adapted, by pivoting the base elements and the end element relative to each other, to an outside angle of about 110°.

By breaking off all three portions A, B, and C, the accessory 20 can be adapted to an outside angle of about 120°.

As shown in FIG. 6, by pivoting the end element 23 relative to the base element 21, 22, the accessory 20 can be adapted to an outside angle of about 90°.

Because the end portion 22 overlaps the end element 23, each of the theoretical angles that the accessory 20 can form benefits from tolerance of plus or minus 5°.

According to a particularly advantageous characteristic of the accessory 20 shown in the figures, it includes resilient return means distinct from said complementary engagement means that allow the two elements to move relative to each other, which return means are suitable for acting between the base element 21, 22 and the end element 23 so as to urge the end element into said deployed position (see FIG. 6).

These resilient return means are preferably implemented in this case in the form of a flexible tongue 27 interposed between the base element 21, 22 and the end element 23.

The tongue 27 is formed integrally with one of the elements of the accessory 20 and has its free end bearing against an end edge of the other one of the elements.

In the example accessory 20 shown in FIGS. 5 and 6, the tongue 27 is attached to the end element 23 and extends freely in a window 26 provided in the inner plate 23C of the end element 23 so as to bear against an end edge 21B of the central portion 21 of the base element 21, 22. The tongue 27 is connected to one edge of the window 26.

The accessory 20 shown in FIG. 1 is put into place on the conduit segment channels 10 in the manner described below with reference to FIG. 2.

On assembly, the accessory 20 takes the configuration shown in FIG. 6 in which the end element 23 is in its deployed position relative to the base element 21, 22. In this position, the tongue 27 is not flexed.

The user moves the accessory 20 as shown in FIG. 6 up to the flanges 12 of the channels 10 in direction A parallel to the touching cut end edges 17 of the webs of the channels 10. This movement takes place at a distance from the touching cut end edges 17 until the end portion 22 of the base element 21, 22 and the end element 23 of the accessory 20 come into contact with said flanges 12.

Thereafter, the accessory 20 is moved in direction B perpendicular to direction A towards the touching cut end edges 17. During this movement, the low wall 21A, 23A of the accessory 20 come to bear progressively against the cut end edges of the flanges 12 of the channels 10. The end element 23 pivots relative to the base element 21, 22 so as to take up its retracted position relative thereto. In this retracted position, the tongue 27 is flexed to a greater or lesser extent (see FIG. 5). During this movement, the resilient tongue 27 tends to urge the end element 23 towards its deployed position (FIG. 6) so that the base element 21, 22 and the end element 23 thus automatically adopt an angle which corresponds exactly to the angle formed between the channels 10, with the low walls 21A, 23A of the accessory 20 remaining pressed against the cut end edges of said flanges 12. The user then does not need to act on the accessory 20 in order to adapt that at the end of its stroke, it is adapted to the angle formed between said channels 10.

At the end of the movement in translation along arrow B, the snap-fastening means 24B, 24C of the accessory 20 co-operate with the bracket-forming rims 14 of said flanges 12 of said channels 10 and the accessory 20 is locked thereto.

The accessory 20 is easy to put into place on said channels, and this can be done by a user using one hand only, while nevertheless ensuring that the end portions of the accessory press firmly against the corresponding flanges once the accessory is in place, so as to ensure that it is held securely on said channels and provides leaktight wall continuity between said flanges.

The present invention is not limited in any way to the embodiment described and shown, and the person skilled in the art can apply any variation within the spirit of the invention.

Figure 8:
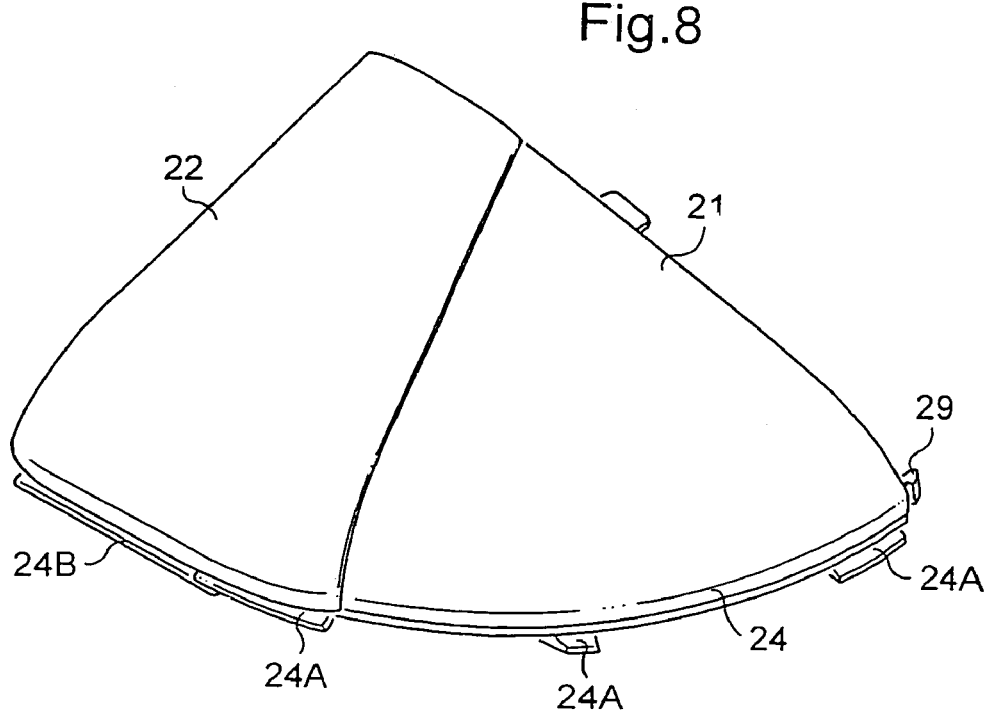
FIG. 8 is a front view of the FIG. 7 base element.
Figure 9:
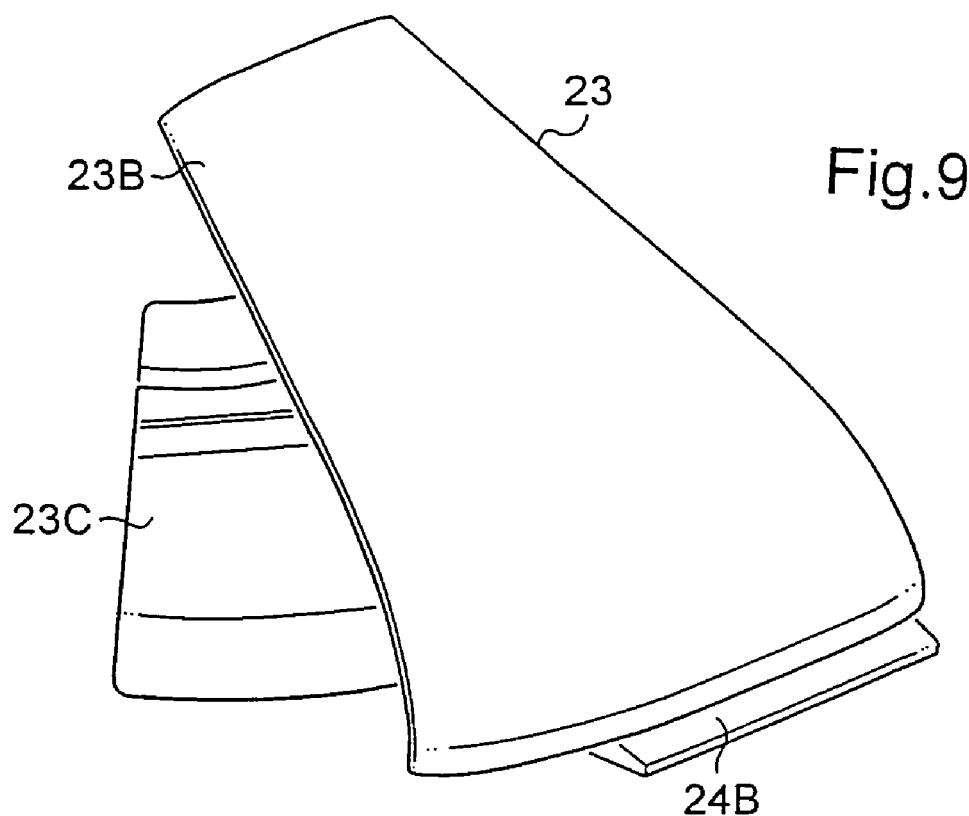
FIG. 9 is a front view of the end element of the FIG. 1 accessory.
Figure 10:
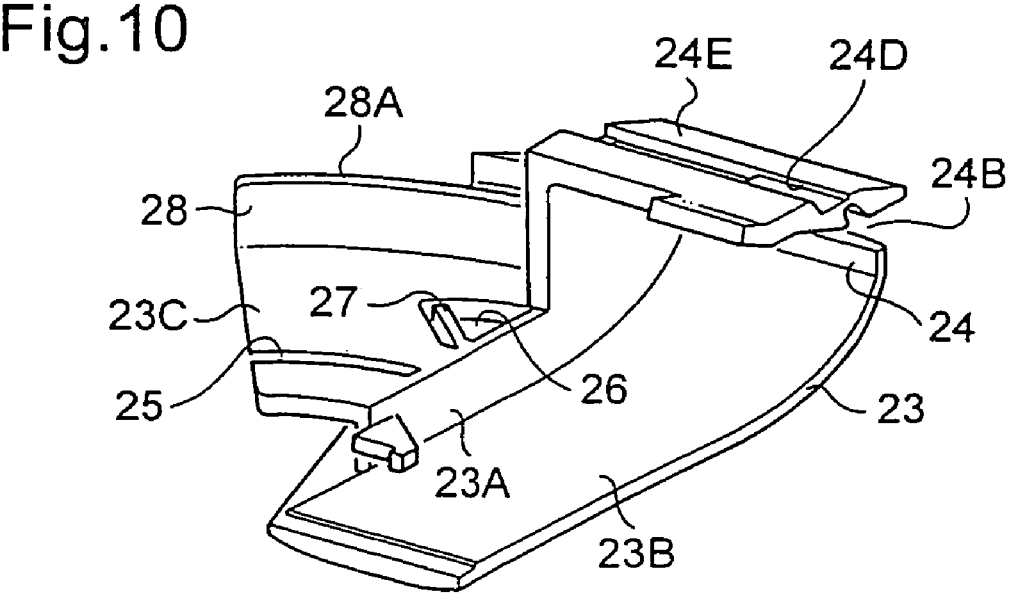
FIG. 10 is a rear view of the FIG. 9 end element.

In particular, an additional element could be provided in the invention in the form of an angular sector for fitting in stationary manner on the central portion of the base element as shown in FIGS. 7 and 8 in order to constitute an annular extension thereof. As shown in FIGS. 5 and 6, a hook 29 is provided on the base element 21, 22 for use in adding the additional element. The end element is then fitted to the base element as extended so that the accessory of the invention can be adapted to outside angles formed between conduit channels lying in the range 60° to 80°.

The accessory may be of any type, and in particular it may include a cover portion covering the empty space between the covers of the conduit segments.

The resilient return means may be entirely different from the tongue described, for example they may be of the spring type and they may be attached to the base element of the accessory.

What is claimed is:

1. An accessory for connecting a portion of a first conduit to a portion of at least one of a second conduit and another accessory, said accessory comprising:
    a base element for engaging on a first portion of a first conduit so as to cover an edge of said first portion;
    an end element fitted to the base element,
    the end element for engaging on a second portion of at least one of a second conduit and the another accessory in order to cover an edge of the at least one of the second conduit and the another accessory;
    engagement means provided on each of said base element and said end element, the engagement means complementarily co-operating with one another to allow relative displacement of said end element and said base element between a first position in which the end element is deployed relative to the base element and a second position in which the end element is retracted towards the base element; and
    resilient return means separate from said engagement means and suitable for acting between the base element and the end element in order to return the end element into said deployed first position, wherein,
    said engagement means act independently from said resilient return means, and
    the resilient return means comprise a flexible tongue interposed between the base element and the end element.

2. An accessory according to claim 1, wherein,
    said tongue is made integrally with one of the base element and the end element and bears via a tongue free end against an end edge of the other one of the base element and the end element.

3. An accessory according to claim 1, wherein said tongue is attached to the end element and extends freely in a window provided in said end element.

4. An accessory according to claim 1, wherein the end element comprises two plates, an edge covering outer plate, and an inner plate, with a portion of the base element being sandwiched between the plates.

5. An accessory according to claim 4, wherein,
    the inner plate of the end element includes firstly a slot co-operating with a strip projecting from said portion of said base element, and secondly a window into which there extends freely the flexible tongue attached to an edge of said window, said tongue bearing against an end edge of said base element.

6. An accessory according to claim 4, wherein the inner plate of the end element includes a rim forming a rib and said portion of the base element includes a projecting strip in which there is formed a groove in which said rib slides.

7. An accessory according to claim 4, wherein the base element comprises a central portion on which the end element is fitted, and an end portion situated remote from the end element, the outer plate of the end element presenting an exterior appearance that is identical to an exterior appearance of the end portion of the base element.

8. An accessory according to claim 1, wherein the base element includes at least one break-off portion.

9. An accessory according to claim 8, wherein each break-off portion constitutes an angular sector.

10. An accessory according to claim 1, further comprising a cheek for establishing wall continuity between two flanges of first and second channels extending in one of the same direction and two different directions.

11. An accessory according to claim 10, wherein said cheek carries a band providing wall continuity between bracket-forming rims of the flanges of said first and second channels, said band including mounting means for mounting a cover segment adapted to close said channels.

12. An accessory for connecting a portion of a first conduit to a portion of at least one of a second conduit and another accessory, said accessory comprising:
a base element for engaging on a first portion of a first conduit so as to cover an edge of said first portion;
an end element fitted to the base element,
the end element for engaging on a second portion of at least one of a second conduit and the another accessory in order to cover an edge of the at least one of the second conduit and the another accessory;
engagement means provided on each of said base element and said end element, the engagement means complementarily co-operating with one another to allow relative displacement of said end element and said base element between a first position in which the end element is deployed relative to the base element and a second position in which the end element is retracted towards the base element; and
resilient return means separate from said engagement means and suitable for acting between the base element and the end element in order to return the end element into said deployed first position, wherein,
said engagement means act independently from said resilient return means, and
said engagement means allow the end element to move in translation relative to the base element.

13. An accessory according to claim 12, wherein said engagement means comprise a groove and a corresponding rib, the rib sliding in the groove.

14. An accessory according to claim 13, wherein the groove belongs to the base element and the rib belongs to the end element.

15. An accessory for connecting a portion of a first conduit to a portion of at least one of a second conduit and another accessory, said accessory comprising:
a base element for engaging on a first portion of a first conduit so as to cover an edge of said first portion;
an end element fitted to the base element
the end element for engaging on a second portion of at least one of a second conduit and the another accessory in order to cover an edge of the at least one of the second conduit and the another accessory;
engagement means provided on each of said base element and said end element, the engagement means complementarily co-operating with one another to allow relative displacement of said end element and said base element between a first position in which the end element is deployed relative to the base element and a second position in which the end element is retracted towards the base element; and
resilient return means separate from said engagement means and suitable for acting between the base element and the end element in order to return the end element into said deployed first position, wherein,
said engagement means act independently from said resilient return means, and
said engagement means comprise a strip and a corresponding slot for engagement with the strip.

16. An accessory according to claim 15, wherein the strip belongs to the base element and the slot belongs to the end element.

17. An accessory according to claim 15, wherein the strip and the slot extend over a circular arc.

* * * * *